United States Patent
Kim et al.

(10) Patent No.: US 7,321,411 B2
(45) Date of Patent: Jan. 22, 2008

(54) LIQUID CRYSTAL DISPLAY INCLUDING COMPENSATION FILM

(75) Inventors: Kyeong-Hyeon Kim, Yongin (KR); Yun Jang, Yongin (JP); Jang-Kun Song, Seoul (KR)

(73) Assignee: Samsung Electronics Co., Ltd., Suwon-Si, Gyeonggi-do (KR)

( * ) Notice: Subject to any disclaimer, the term of this patent is extended or adjusted under 35 U.S.C. 154(b) by 0 days.

(21) Appl. No.: 10/745,940

(22) Filed: Dec. 23, 2003

(65) Prior Publication Data
US 2004/0160559 A1 Aug. 19, 2004

(30) Foreign Application Priority Data
Dec. 24, 2002 (KR) .................. 10-2002-0083710

(51) Int. Cl.
G02F 1/1335 (2006.01)
(52) U.S. Cl. ........................ 349/118; 349/119
(58) Field of Classification Search ........ 349/117–119, 349/96
See application file for complete search history.

(56) References Cited

U.S. PATENT DOCUMENTS

| | | | | |
|---|---|---|---|---|
| 5,249,071 A | 9/1993 | Yoshimizu et al. | ......... | 349/118 |
| 6,339,460 B1 | 1/2002 | Saitoh | ......... | 349/117 |
| 6,628,359 B1 * | 9/2003 | Terashita et al. | ......... | 349/120 |
| 6,646,701 B2 * | 11/2003 | Lyu et al. | ......... | 349/119 |
| 6,919,946 B2 * | 7/2005 | Allen et al. | ......... | 349/121 |

| | | | | |
|---|---|---|---|---|
| 2002/0149733 A1 | 10/2002 | Lyu et al. | ......... | 349/155 |

FOREIGN PATENT DOCUMENTS

| | | |
|---|---|---|
| JP | 2001-350022 | 5/1997 |
| JP | 2000-235185 | 8/2000 |
| JP | 2001-305528 | 10/2001 |
| KR | 10-1999-0059998 | 7/1999 |
| KR | 10-0265054 | 6/2000 |
| KR | 10-2001-0111823 | 12/2001 |
| KR | 10-2002-0017317 | 3/2002 |
| KR | 10-2002-0028006 | 4/2002 |

OTHER PUBLICATIONS

English Language Abstract, KR Patent First Publication No. 10-1999-0059998, Jul. 26, 1999, 2 pages.
English Language Abstract, KR Patent First Publication No. 10-0265054, Jun. 9, 2000, 2 pages.
English Language Abstract, KR Patent First Publication No. 10-2001-0111823, Dec. 20, 2001, 1 page.

(Continued)

*Primary Examiner*—Dung T. Nguyen
(74) *Attorney, Agent, or Firm*—MacPherson Kwok Chen & Held LLP

(57) ABSTRACT

A liquid crystal display is provided, which includes: a first panel; a second panel facing the first panel; a liquid crystal layer interposed between the first panel and the second panel; a biaxial compensation film disposed on an outer surface of the first panel; a first polarizing film disposed on an outer surface of the biaxial compensation film; a C-plate uniaxial compensator disposed on an outer surface of the second panel and having a horizontal retardation lower than about 10 nm; and a second polarizing film disposed on an outer surface of the C-plate uniaxial compensator.

30 Claims, 3 Drawing Sheets

OTHER PUBLICATIONS

English Language Abstract, KR Patent First Publication No. 10-2002-0017317, Mar. 07, 2002, 2 pages.
English Language Abstract, KR Patent First Publication No. 10-2002-0028006, Apr. 15, 2002, 2 pages.
English Language Abstract, JP Patent First Publication No. 2001-305528, Oct. 31, 2001, 1 page.
English Language Abstract, JP Patent First Publication No. 2001-350022, Dec. 21, 2001, 1 page.

* cited by examiner

LIQUID CRYSTAL DISPLAY INCLUDING COMPENSATION FILM

BACKGROUND OF THE INVENTION (a) Field of the Invention

The present invention relates to a liquid crystal display, and in particular, to a liquid crystal display including a compensation film.

(b) Description of the Related Art

A liquid crystal display ("LCD") includes upper and lower panels having field-generating electrodes, a liquid crystal (LC) layer interposed therebetween, and a pair of polarizing films attached on outer surfaces of the panels. An electric field is generated in the LC layer by applying electric voltages to the field-generating electrodes. The intensity of the electric field is adjusted to control orientations of LC molecules, which determine a polarization of light passing through the LC layer, and the polarizing films convert the polarization of the light into the transmittance of the light, thereby displaying desired images.

A typical LCD includes a common electrode provided on a panel and a plurality of pixel electrodes provided on another panel. The common electrode and the pixel electrode generate electric field for re-arranging LC molecules to control the transmittance of light passing through the panels. The LCD further includes a plurality of thin film transistors (TFTs) for switching voltages applied to the pixel electrodes.

Among the LCDs, a vertically aligned mode LCD aligning the LC molecules vertical to the panels and including crossed polarizers are increasingly preferred because of its high contrast ratio and wide viewing angle.

The LCD has a problem of light leakage from a side view, which deteriorates lateral visibility and narrows lateral viewing angle. The lateral light leakage may be caused by two reasons.

First, although there is no retardation from a front view since light path from the front view coincides with optic axis of the vertically aligned LC layer, the light path from the side view is offset from the optic axis and this results in the retardation and the change of the light polarization to yield light leakage. Second, although the light from the front view experiences crossed polarization axes, the light from the side view experiences obliquely intersecting polarization axes to yield light leakage.

Although the light leakage may be reduced by using compensation films (or retardation films), the compensation films are very expensive to increase the manufacturing cost of the LCD.

SUMMARY OF THE INVENTION

A liquid crystal display is provided, which includes: a first panel; a second panel facing the first panel; a liquid crystal layer interposed between the first panel and the second panel; a biaxial compensation film disposed on an outer surface of the first panel; a first polarizing film disposed on an outer surface of the biaxial compensation film; a C-plate uniaxial compensator disposed on an outer surface of the second panel and having a horizontal retardation lower than about 10 nm; and a second polarizing film disposed on an outer surface of the C-plate uniaxial compensator.

Each of the first and the second polarizing films may include a polarizing layer and a pair of protective layers, preferably including TAC having a vertical retardation ranging from about 45 nm to about 65 nm, attached on both surfaces of the polarizing layer.

The C-plate uniaxial compensator has a vertical retardation ($R_{th(c\text{-}plate)}$) and the biaxial compensation film has a horizontal retardation $R_{0(biaxial)}$ and a vertical retardation $R_{th(biaxial)}$, which preferably satisfy:

$$R_{0(biaxial)} = [0.0028 \times (R_{th(c\text{-}plate)})^2 - 0.0833 \times R_{th(c\text{-}plate)} 50] \pm 15 \text{ nm; and}$$

$$R_{th(biaxial)} = [0.0007 \times (R_{th(c\text{-}plate)})^2 - 0.9583 \times R_{th(c\text{-}plate)} + 165]20 \text{ nm.}$$

The C-plate uniaxial compensator includes one or two TAC films.

The TAC film has a vertical retardation ranging from about 45 nm to about 55 nm or from about 55 nm to about 65 nm.

For the liquid crystal display including one TAC film having a vertical retardation ranging from about 45 nm to about 55 nm, the biaxial compensation film preferably has a horizontal retardation ranging from about 43 nm to about 73 nm and a vertical retardation ranging from about 95 nm to about 135 nm when the TAC film has a slow axis parallel to an absorption axis of the second polarizing film, while the biaxial compensation film preferably has a horizontal retardation ranging from about 35 nm to about 65 nm and a vertical retardation ranging from about 95 nm to about 135 nm when the TAC film has a slow axis perpendicular to an absorption axis of the second polarizing film.

For the liquid crystal display including one TAC film having a vertical retardation ranging from about 55 nm to about 65 nm, the biaxial compensation film preferably has a horizontal retardation ranging from about 50 nm to about 80 nm and a vertical retardation ranging from about 85 nm to about 125 nm when the TAC film has a slow axis parallel to an absorption axis of the second polarizing film, the biaxial compensation film has a horizontal retardation ranging from about 35 nm to about 65 nm and a vertical retardation ranging from about 85 nm to about 125 nm when the TAC film has a slow axis perpendicular to an absorption axis of the second polarizing film.

For the liquid crystal display including two TAC films having a vertical retardation ranging from about 45 nm to about 55 nm, the biaxial compensation film preferably has a horizontal retardation ranging from about 65 nm to about 95 nm and a vertical retardation ranging from about 42 nm to about 82 nm, the biaxial compensation film preferably has a horizontal retardation ranging from about 45 nm to about 75 nm and a vertical retardation ranging from about 42 nm to about 82 nm when each of the TAC films has a slow axis parallel to an absorption axis of the second polarizing film, when the TAC films have slow axes parallel to each other and perpendicular to an absorption axis of the second polarizing film, and the biaxial compensation film preferably has a horizontal retardation ranging from about 55 nm to about 85 nm and a vertical retardation ranging from about 42 nm to about 82 nm when one of the TAC films has a slow axis parallel to an absorption axis of the second polarizing film and the other of the TAC films has a slow axis perpendicular to the absorption axis of the second polarizing film.

For the liquid crystal display including two TAC films having a vertical retardation ranging from about 55 nm to about 65 nm, the biaxial compensation film preferably has a horizontal retardation ranging from about 80 nm to about 110 nm and a vertical retardation ranging from about 20 nm to about 60 nm when each of the TAC films has a slow axis parallel to an absorption axis of the second polarizing film, the biaxial compensation film preferably has a horizontal retardation ranging from about 55 nm to about 85 nm and a vertical retardation ranging from about 20 nm to about 60 nm when the TAC films have slow axes parallel to each other and perpendicular to an absorption axis of the second polarizing film, and the biaxial compensation film preferably has a horizontal retardation ranging from about 65 nm to about 95 nm and a vertical retardation ranging from about 20 nm to about 60 nm when one of the TAC films has a slow axis parallel to an absorption axis of the second polarizing film and the other of the TAC films has a slow axis perpendicular to the absorption axis of the second polarizing film.

The first polarizing film may include a polarizing layer and a light recycling layer combined with the polarizing layer.

The first polarizing film serves as a polarizer and the second polarizing film serves as an analyzer, or vice versa.

One of the first and the second panels includes a plurality of pixel electrodes and a plurality of thin film transistors connected to the pixel electrodes.

The liquid crystal layer may have a homeotropic alignment, and the first and the second panels may include first and second electrodes, respectively, for generating an electric field rearranging molecules in the liquid crystal layer. At least one of the first and the second electrodes may have a cutout.

BRIEF DESCRIPTION OF THE DRAWINGS

The present invention will become more apparent by describing embodiments thereof in detail with reference to the accompanying drawings in which.

DETAILED DESCRIPTION OF EMBODIMENTS

Figure 1:
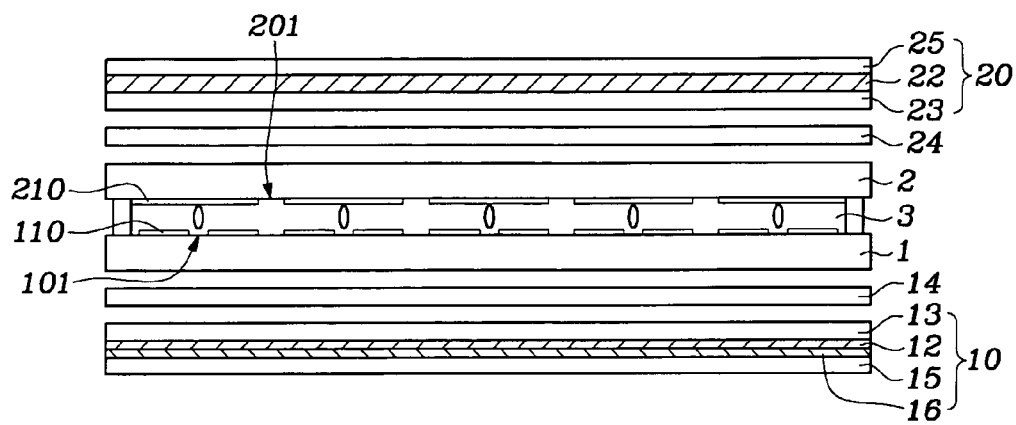
FIG. 1 is a sectional view of an LCD according to an embodiment of the present invention.

The present invention now will be described more fully hereinafter with reference to the accompanying drawings, in which preferred embodiments of the invention are shown. The present invention may, however, be embodied in many different forms and should not be construed as limited to the embodiments set forth herein.

In the drawings, the thickness of layers, films and regions are exaggerated for clarity. Like numerals refer to like elements throughout. It will be understood that when an element such as a layer, film, region or substrate is referred to as being "on" another element, it can be directly on the other element or intervening elements may also be present. In contrast, when an element is referred to as being "directly on" another element, there are no intervening elements present.

Now, liquid crystal displays according to embodiments of the present invention will be described with reference to the accompanying drawings.

FIG. 1 is a sectional view of an LCD according to an embodiment of the present invention.

Referring to FIG. 1, an LCD according an embodiment of the present invention includes a pair of panels 1 and 2 facing each other and separated from each other with a predetermined gap, a liquid crystal (LC) layer 3 filled in the gap between the two panels 1 and 2, a pair of polarizing films including a polarizer 10 and an analyzer 20 disposed on outer surfaces on the panels 1 and 2, and a pair of phase compensation films (or retardation films) 14 and 24 disposed between the panels 1 and 2 and the polarizing films 10 and 20.

The panel 1 includes a substrate preferably made of transparent glass, a plurality of gate lines (not shown), a plurality of data lines (not shown), an array of thin film transistors (TFTs) (not shown) connected to the gate lines and the data lines, and an array of pixel electrodes (110) connected to the TFTs. The TFTs transmit data voltages from the data lines in response to gate signals from the gate lines.

The panel 2 includes a substrate (not shown) preferably made of transparent glass, a black matrix (not shown) having a plurality of openings facing the pixel electrodes, an array of color filters (not shown) facing the pixel electrodes, and a common electrode (210) preferably made of transparent conductive material such as indium tin oxide (ITO) and indium zinc oxide (IZO). However, the black matrix, the color filters, and/or the common electrode may be provided on the panel 1.

LC molecules in the LC layer 3 are aligned vertical (or homeotropical) to the surface of the panels 1 and 2.

The pixel electrodes and/or the common electrode may have at least one cutout (101, 201) for determining the tilt directions of the LC molecules.

The exemplary configurations of the panels 1 and 2 and the LC layer 3 are illustrated in U.S. Patent Application Publication No. 2002/0145695 A1, which is incorporated in this specification by reference.

Each polarizing film 10 or 20 includes a polarizing layer 12 or 22 preferably made of polyvinyl alcohol (PVA) and a pair of protective layers 13 and 15 or 13 and 25 preferably made of triacetyl-cellulose (TAC) and attached on both surfaces of the polarizing layer 12 or 22. The polarizing film 10 or 20 may further include an anti-glare or anti-reflective layer attached on one of the protective layers 13 and 15 or 13 and 25.

The polarizer film 10 may further include a light recycling layer (16) combined with the polarizing layer 12. The light recycling layer preferably includes a commercially available Dual Brightness Enhancement Film-Diffuse (DBEF-D), Bepol, or Nipocs.

The polarizing films 10 and 20 preferably have crossed polarization axes.

The compensation film 14 preferably includes a C-plate uniaxial compensation film or a quasi C-plate uniaxial compensation film, while the compensation film 24 preferably includes a biaxial compensation film.

The compensation film 14 is preferably made of cheap and reliable TAC and it may have a double-layered structure including two layers adhering to each other with an adhesive or including two laminated layers. However, the compensation film 14 may be made of another material instead of TAC.

A horizontal phase retardation $R_0$ and a vertical phase retardation $R_{th}$ of a retardation film are defined as $R_0=(n_x-n_y)\times d$ and $R_{th}=(n_z-(n_x+n_y)/2)\times d$, where d is the thickness of a retardation film. Since a C plate has refractive dielectric anisotropy satisfying $n_x=n_y>n_z$ when the z axis is defined to be normal to the surface of the film and $n_x$, $n_y$ and $n_z$ are refractive indices in x, y and z directions, respectively, the horizontal phase retardation $R_0$ of the C plate is zero. In the meantime, a quasi C plate satisfies a relation $R_0<10<<R_{th}$. A TAC film, which has a horizontal and vertical phase retardations $R_0$ and $R_{th}$ satisfying the relations $R_0<10$ and $5R_0<R_{th}$, is a quasi C plate.

The biaxial compensation film 24 satisfies $n_x \neq n_y \neq n_z$. The vertical and the horizontal phase retardations $R_{th}$ and $R_0$ of the biaxial compensation film 24 are determined depending on the vertical phase retardation $R_{th}$ of the compensation film 14 such that:

$$R_{0(biaxial)} = [0.0028 \times (R_{th(c-plate)})^2 - 0.00833 \times R_{th(c-plate)} + 50] + 15 \text{ nm} \quad (1)$$

$$R_{th(biaxial)} = [-0.0007 \times (R_{th(c-plate)})^2 - 0.9583 \times R_{th(c-plate)} + 165] \pm 20 \text{ nm} \quad (2)$$

Relations 1 and 2, which are obtained from experiments, give a viewing angle equal to or larger than about 85 degrees in a direction making an angle of about 45 degrees with the polarization axes of the polarizing films 10 and 20.

Figure 2:
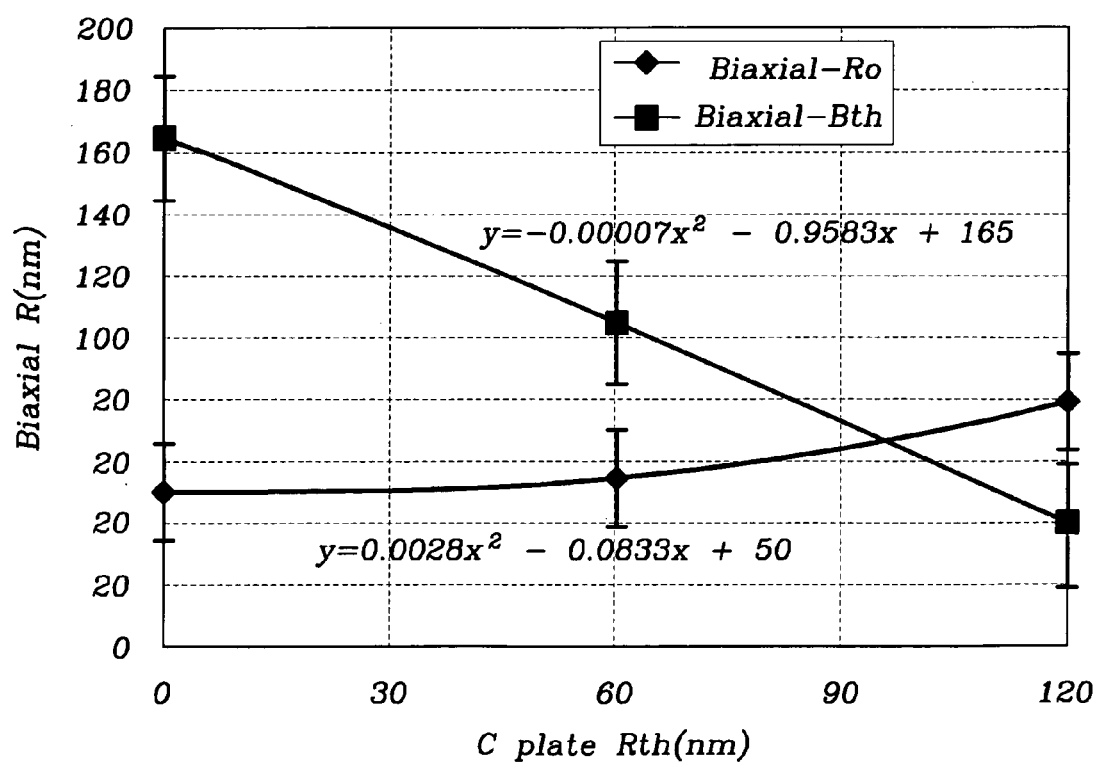
FIG. 2 is a graph illustrating phase retardations of a biaxial compensation film as function of a vertical phase retardation of a C-plate uniaxial compensation film.

FIG. 2 is a graph illustrating the phase retardations of the biaxial compensation film as function of the vertical phase retardation of the C-plate uniaxial compensation film as shown in Relations 1 and 2.

The positions of the C-plate uniaxial compensation film 14 and the biaxial compensation film 24 can be exchanged.

TABLE 1 illustrates some cases of combinations of the retardations of the biaxial film and the C-plate, which are easily obtained.

TABLE 1

|  | Case 1 | Case 2 | Case 3 | Case 4 |
|---|---|---|---|---|
| $R_{th(c-plate)}$ | 50 | 60 | 100 | 120 |
| $R_{0(biaxial)}$ | 50 | 60 | 70 | 80 |
| $R_{th(biaxial)}$ | 115 | 105 | 62 | 40 |

The values 50, 60, 100 and 120 of the vertical phase retardation $R_{th}$ of the C-plate are chosen because they are easily realized by using commercially available TAC films. There are two kinds of the commercially available TAC films, one having a thickness of 80 microns and a vertical phase retardation $R_{th}$ of 50 nm and the other having a thickness of 100 microns and a vertical phase retardation $R_{th}$ of 60 nm. The retardations of 100 nm and 120 nm are obtained by using a pair of the TAC films. Here, the TAC film with the retardation of about 50 nm practically gives the retardation in the range from about 45 nm to about 55 nm, and similarly, the TAC film the retardation of about 60 nm practically gives the retardation in the range from about 55 nm to about 65 nm.

As described above, the TAC film is not an ideal C-plate uniaxial film, and it gives a horizontal retardation $R_0$ of about 0–10 nm. Considering the non-zero horizontal retardation of the TAC films, the horizontal phase retardation $R_0$ shown in TABLE 1 is varied. It is considered when slow axes of the TAC films are parallel to and perpendicular to an absorption axis of the polarizer adjacent thereto.

TABLE 2 illustrates the case that the slow axes of the TAC films are parallel to the absorption axis of the polarizer. Since the non-vanishing horizontal retardations $R_0$ of the TAC films deteriorate the viewing angle, it is preferable that the horizontal retardation $R_0$ of the biaxial film is increased.

TABLE 2

| | Easy Axes of TAC//Absorption Axis of Polarizer | | | |
|---|---|---|---|---|
|  | One 50 nm TAC | One 60 nm TAC | Two 50 nm TAC | Two 60 nm TAC |
| $R_{th(c-plate)}$ | 50 | 60 | 100 | 120 |
| $R_{0(biaxial)}$ | 58 | 65 | 80 | 95 |
| $R_{th(biaxial)}$ | 115 | 105 | 62 | 40 |

The parallelism between the slow axes of the TAC films and the absorption axis of the polarizer facilitates the manufacturing of the polarizer. In detail, since the TAC film is rolled along its slow axis and the polarizing film is rolled along its absorption axis, the two rolls are aligned in parallel and unrolled to be laminated or attached such that the slow axis of the TAC film and the absorption axis of the polarizer are aligned parallel.

Next, the case that at least one of the slow axes of the TAC films and the absorption axis of the polarizer are perpendicular to each other is described.

TABLE 3 illustrates the case with one sheet of TAC film. Since the non-vanishing horizontal retardation $R_0$ of the TAC film improves the viewing angle, it is preferable that the horizontal retardation $R_0$ of the biaxial film is decreased.

TABLE 3

| | Slow Axis of TAC ⊥ Absorption Axis of Polarizer | |
|---|---|---|
|  | One 50 nm TAC | One 60 nm TAC |
| $R_{th(c-plate)}$ | 50 | 60 |
| $R_{0(biaxial)}$ | 50 | 50 |
| $R_{th(biaxial)}$ | 115 | 105 |

TABLE 3 shows that a sheet of 60 nm TAC film matches with a biaxial compensation film of commercially available Arton with $R_0=50$ and $R_{th}=105$ or S-cina $R_0=50$ and $R_{th}=90$.

TABLE 4 illustrates the case with two sheets of TAC films.

TABLE 4

|  | Two 50 nm TAC Absorption Axis// TAC1⊥ TAC2 | Two 60 nm TAC Absorption Axis// TAC1⊥ TAC2 | Two 50 nm TAC Absorption Axis⊥ TAC1// TAC2 | Two 60 nm TAC Absorption Axis⊥ TAC1// TAC2 |
|---|---|---|---|---|
| $R_{th(c-plate)}$ | 100 | 120 | 100 | 120 |
| $R_{0(biaxial)}$ | 70 | 80 | 60 | 70 |
| $R_{th(biaxial)}$ | 62 | 40 | 62 | 40 |

In TABLE 4, "Absorption Axis//TAC1⊥TAC2" means that the slow axis of one of the TAC films is parallel to the absorption axis of the polarizer, while the slow axis of the other of the TAC films is perpendicular to the absorption axis of the polarizer, and "Absorption Axis⊥TAC1//TAC2" means that the slow axes of the TAC films are perpendicular to the absorption axis of the polarizer.

TABLE 5 summarizes TABLEs 1 to 4.

TABLE 5

| | C-plate | | Biaxial | | |
|---|---|---|---|---|---|
| | TAC Type | Relation | $R_0$ | $R_{th}$ | Material |
| Case 1 | One | Abs. Axis//TAC | 58 ± 15 | 115 ± 20 | Arton, |
| Case 2 | 50 nm TAC | Abs. Axis⊥TAC | 50 ± 15 | 115 ± 20 | S-cina, RAC, etc. |
| Case 3 | One | Abs. Axis//TAC | 65 ± 15 | 105 ± 20 | |
| Case 4 | 60 nm TAC | Abs. Axis⊥TAC | 50 ± 15 | 105 ± 20 | |
| Case 5 | Two | Abs. Axis//TAC1//TAC2 | 80 ± 15 | 62 ± 20 | |
| Case 6 | 50 | Abs. Axis⊥TAC1//TAC2 | 60 ± 15 | 62 ± 20 | |
| Case 7 | nm TAC | Abs. Axis//TAC1⊥TAC2 | 70 ± 15 | 62 ± 20 | |
| Case 8 | Two | Abs. Axis//TAC1//TAC2 | 95 ± 15 | 40 ± 20 | |
| Case 9 | 60 | Abs. Axis⊥TAC1//TAC2 | 70 ± 15 | 40 ± 20 | |
| Case 10 | nm TAC | Abs. Axis//TAC1⊥TAC2 | 80 ± 15 | 40 ± 20 | |

In TABLE 5, "Abs. Axis//TAC1//TAC2" means that the slow axes of the TAC films are parallel to the absorption axis of the polarizer, "Abs. Axis⊥TAC1//TAC2" means that the slow axes of one of the TAC films are perpendicular to the absorption axis of the polarizer, and "Abs. Axis//TAC1⊥TAC2" means that the slow axis of one of the TAC films is parallel to the absorption axis of the polarizer, while the slow axis of the other of the TAC films is perpendicular to the absorption axis of the polarizer.

It is noted that TAC shown in TABLE 5 does not include TAC used as the protection layers 13, 15, 23 and 25. Each of the TAC layers 13, 15, 23 and 25 may have a vertical retardation $R_{th}$ ranging from about 45 nm to about 65 nm and a horizontal retardation $R_0$ ranging from about zero to about 10 nm. The TAC layers 13, 15, 23 and 25 have slow axes parallel to the absorption axes of the respective polarizing films 10 and 20.

Among the above-arranged ten cases, Cases 1–4 with one TAC film are advantageous in the manufacturing cost, and Cases 3 and 4 exhibit a viewing angle and color characteristics better than or at least as good as cases using two biaxial films. In particular, Case 4 shows a viewing angle and color characteristics better than the cases using two biaxial films.

Figure 3:
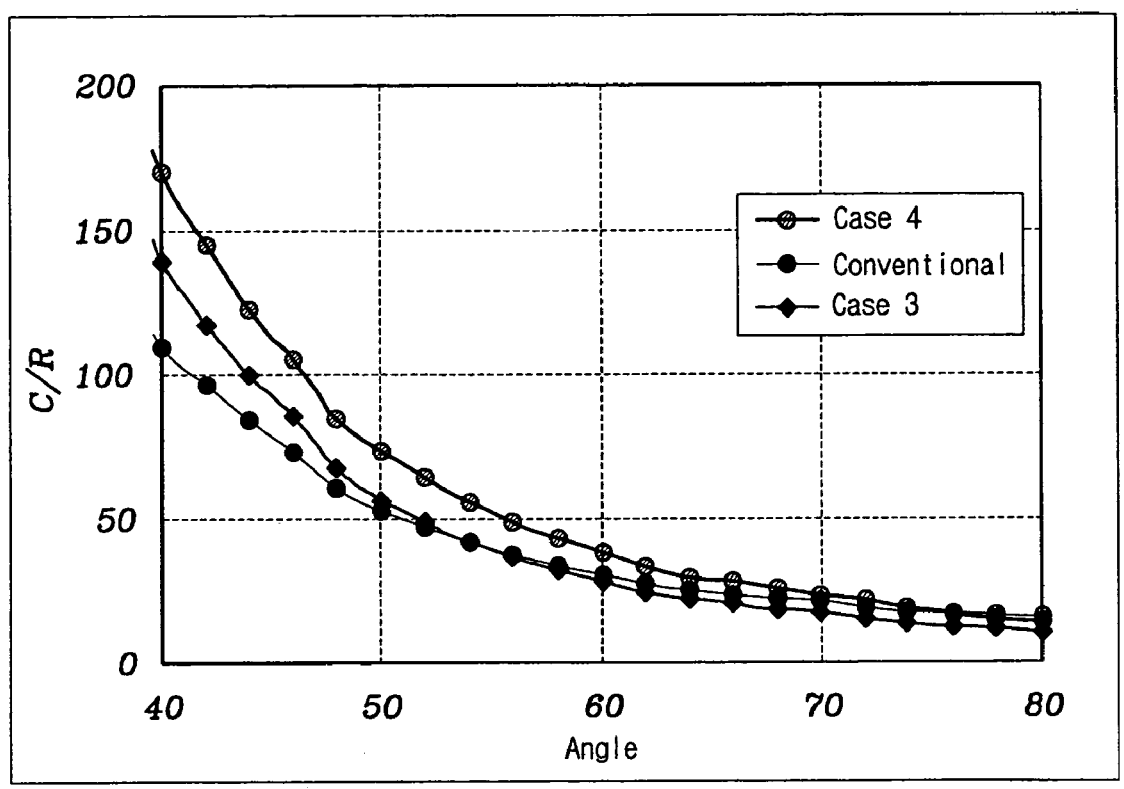
FIG. 3 is a graph showing a contrast ratio (C/R) along a diagonal direction as function of a viewing angle for various cases.

FIG. 3 is a graph showing a contrast ratio (C/R) along a diagonal direction as function of a viewing angle for Cases 3 and 4 and a conventional case using two biaxial films.

Referring to FIG. 3, Case 4 shows the contrast ratio (C/R) higher than the conventional case for all angles from zero degrees to about 80 degrees. Although the contrast ratio of Case 3 is higher than the conventional one in some angular ranges and it is lower than the conventional one in other angular ranges, the contrast ratio of Case 3 is equal to or higher than about 10 for all angular ranges, which is comparable with the conventional case.

Figure 4:
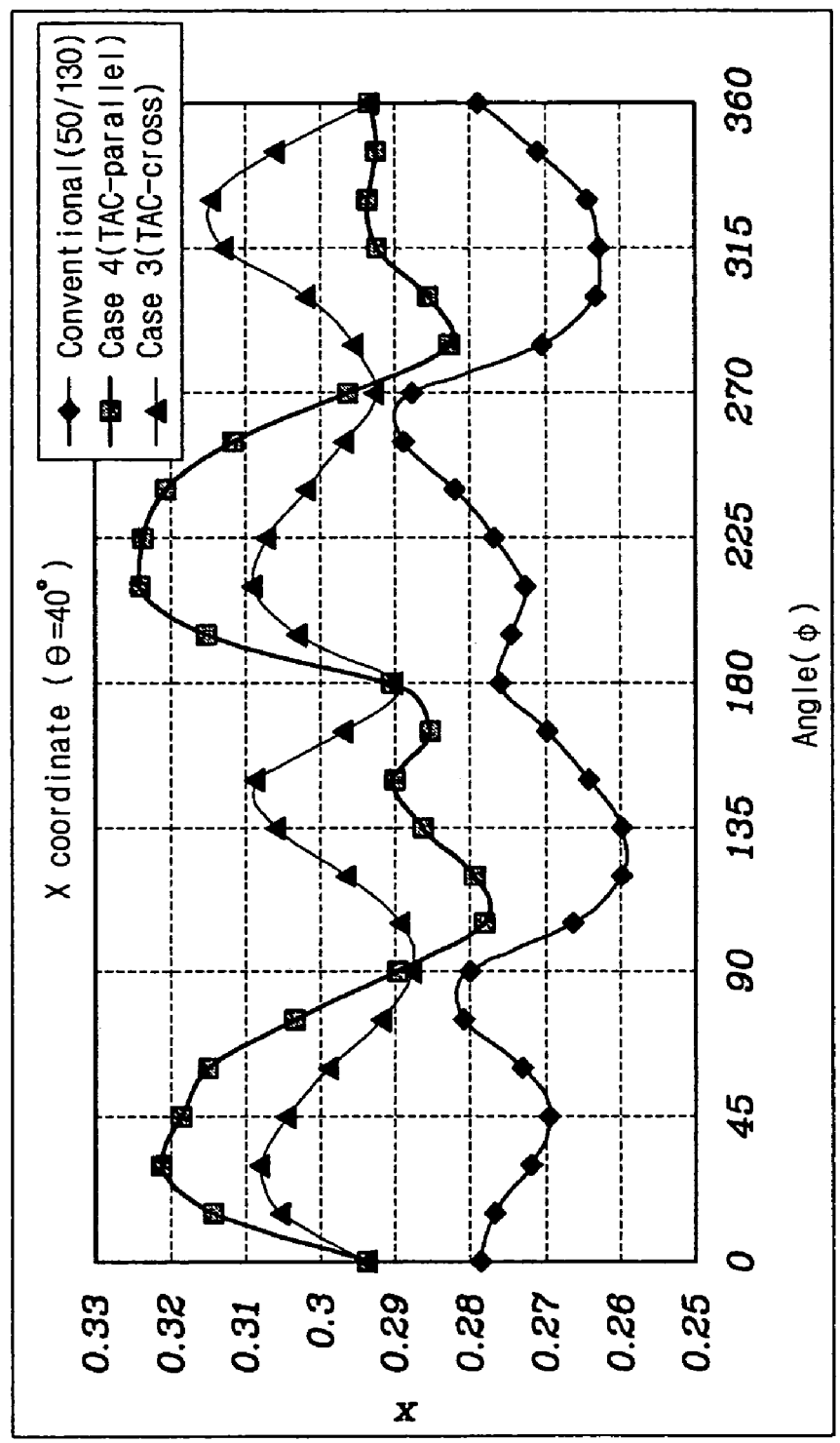
FIG. 4 is a graph showing an x color coordinate of a black state LCD as function of viewing angle for various cases.

FIG. 4 is a graph showing an x color coordinate of a black state LCD as function of viewing angle for Cases 3 and 4 and a conventional case using two biaxial films.

As shown in FIG. 4, Cases 3 and 4 exhibit higher x color coordinates in a black state than the conventional case for all angular ranges. This means that Cases 3 and 4 reduce bluish phenomenon such that the black states in Cases 3 and 4 is closer to a perfect black than that in the conventional art.

The manufacturing cost of the compensation films for the cases using one C-plate uniaxial film and one biaxial film is cheaper than that for the cases using two biaxial films by about /1;4 to about /2;3.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A liquid crystal display comprising:
a first panel;
a second panel facing the first panel;
a liquid crystal layer interposed between the first panel and the second panel;
a biaxial compensation film disposed on an outer surface of the first panel;
a first polarizing film disposed on an outer surface of the biaxial compensation film;
a C-plate uniaxial compensator disposed on an outer surface of the second panel and having a horizontal retardation lower than about 10 nm and
a second polarizing film disposed on an outer surface of the C-plate uniaxial compensator,
wherein the C-plate uniaxial compensator has a vertical retardation ($R_{th(c-plate)}$) and the biaxial compensation film has a horizontal retardation $R_{0(biaxial)}$ and a vertical retardation $R_{th(biaxial)}$ satisfying:

$$R_{0(biaxial)} = [0.0028 \times (R_{th(c-plate)})^2 - 0.00833 \times R_{th(c-plate)} + 50] \pm . \text{ nm; and}$$

$$R_{th(biaxial)} = [-0.0007 \times (R_{th(c-plate)})^2 - 0.9583 \times R_{th(c-plate)} + 165] \pm 20 \text{ nm.}$$

2. The liquid crystal display of claim 1, wherein each of the first and the second polarizing films comprises a polarizing layer and a pair of protective layers attached on both surfaces of the polarizing layer.

3. The liquid crystal display of claim 1, wherein each of the protective layers comprises TAC.

4. The liquid crystal display of claim 3, wherein the TAC has a vertical retardation ranging from about 45 nm to about 65 nm.

5. The liquid crystal display of claim 1, wherein the C-plate uniaxial compensator comprises a TAC film.

6. The liquid crystal display of claim 5, wherein the TAC film has a vertical retardation ranging from about 45 nm to about 55 nm.

7. The liquid crystal display of claim 6, wherein the TAC film has a slow axis parallel to an absorption axis of the second polarizing film, and the biaxial compensation film has a horizontal retardation ranging from about 43 nm to about 73 nm and a vertical retardation ranging from about 95 nm to about 135 nm.

8. The liquid crystal display of claim 6, wherein the TAC film has a slow axis perpendicular to an absorption axis of the second polarizing film, and the biaxial compensation film has a horizontal retardation ranging from about 35 nm to about 6.5 nm and a vertical retardation ranging from about 95 nm to about 135 nm.

9. The liquid crystal display of claim 5, wherein the TAC film has a vertical retardation ranging from about 55 nm to about 65 nm.

10. The liquid crystal display of claim 9, wherein the TAC film has a slow axis parallel to an absorption axis of the second polarizing film, and the biaxial compensation film has a horizontal retardation ranging from about 50 nm to about 80 nm and a vertical retardation ranging from about 85 nm to about 125 nm.

11. The liquid crystal display of claim 9, wherein the TAC film has a slow axis perpendicular to an absorption axis of the second polarizing film, and the biaxial compensation film has a horizontal retardation ranging from about 35 nm to about 65 nm and a vertical retardation ranging from about 85 nm to about 125 nm.

12. The liquid crystal display of claim 1, wherein the C-plate uniaxial compensator comprises two TAC films.

13. The liquid crystal display of claim 12, wherein each of the TAC films has a vertical retardation ranging from about 45 um to about 55 nm.

14. The liquid crystal display of claim 13, wherein each of the TAC films has a slow axis parallel to an absorption axis of the second polarizing film, and the biaxial compensation film has a horizontal retardation ranging from about 65 nm to about 95 nm and a vertical retardation ranging from about 42 nm to about 82 nm.

15. The liquid crystal display of claim 13, wherein the TAO films have slow axes parallel to each other and perpendicular to an absorption axis of the second polarizing film, and the biaxial compensation film has a horizontal retardation ranging from about 45 nm to about 75 um and a vertical retardation ranging from about 42 nm to about 82 nm.

16. The liquid crystal display of claim 13, wherein one of the TAC films has a slow axis parallel to an absorption axis of the second polarizing film, the other of the TAC films has a slow axis perpendicular to the absorption axis of the second polarizing film, and the biaxial compensation film has a horizontal retardation ranging from about 55 nm to about 85 nm and a vertical retardation ranging from about 42 nm to about 82 nm.

17. The liquid crystal display of claim 12, wherein each of the TAC films has a vertical retardation ranging from about 55 nm to about 65 nm.

18. The liquid crystal display of claim 17, wherein the TAC films have slow axes parallel to each other and perpendicular to an absorption axis of the second polarizing film, and the biaxial compensation film has a horizontal retardation ranging from about 55 nm to about 85 nm and a vertical retardation ranging from about 20 nm to about 60 nm.

19. The liquid crystal display of claim 17, wherein one of the TAC films has a slow axis parallel to an absorption axis of the second polarizing film, the other of the TAC films has a slow axis perpendicular to the absorption axis of the second polarizing film, and the biaxial compensation film has a horizontal retardation ranging from about 65 nm to about 95 nm and a vertical retardation ranging from about 20 nm to about 60 nm.

20. The liquid crystal display of claim 17, wherein each of the TAC films has a slow axis parallel to an absorption axis of the second polarizing film, and the biaxial compensation film has a horizontal retardation ranging from about 80 nm to about 110 nm and a vertical retardation ranging from about 20 nm to about 60 nm.

21. The liquid crystal display of claim 1, wherein the first polarizing film comprises a polarizing layer and a light recycling layer combined with the polarizing layer.

22. The liquid crystal display of claim 1, wherein the first polarizing film serves as a polarizer and the second polarizing film serves as an analyzer.

23. The liquid crystal display of claim 22, wherein the first panel comprises a plurality of pixel electrodes and a plurality of thin film transistors connected to the pixel electrodes.

24. The liquid crystal display of claim 22, wherein the second panel comprises a plurality of pixel electrodes and a plurality of thin film transistors connected to the pixel electrodes.

25. The liquid crystal display of claim 1, wherein the second polarizing film serves as a polarizer and the first polarizing film serves as an analyzer.

26. The liquid crystal display of claim 25, wherein the second panel comprises a plurality of pixel electrodes and a plurality of thin film transistors connected to the pixel electrodes.

27. The liquid crystal display of claim 25, wherein the first panel comprises a plurality of pixel electrodes and a plurality of thin film transistors connected to the pixel electrodes.

28. The liquid crystal display of claim 1, wherein the liquid crystal layer has a homeotropic alignment.

29. The liquid crystal display of claim 28, wherein the first and the second panels comprise first and second electrodes, respectively, for generating an electric field rearranging molecules in the liquid crystal layer.

30. The liquid crystal display of claim 29, wherein at least one of the first and the second electrodes has a cutout.

* * * * *